US007796872B2

(12) United States Patent
Sachs et al.

(10) Patent No.: US 7,796,872 B2
(45) Date of Patent: Sep. 14, 2010

(54) METHOD AND APPARATUS FOR PRODUCING A SHARP IMAGE FROM A HANDHELD DEVICE CONTAINING A GYROSCOPE

(75) Inventors: David Sachs, San Jose, CA (US); Jianbo Shi, Philadelphia, PA (US); Steven S. Nasiri, Saratoga, CA (US); Kishore Moturi, Sunnyvale, CA (US)

(73) Assignee: Invensense, Inc., Sunnyvale, CA (US)

( * ) Notice: Subject to any disclaimer, the term of this patent is extended or adjusted under 35 U.S.C. 154(b) by 476 days.

(21) Appl. No.: 11/649,936

(22) Filed: Jan. 5, 2007

(65) Prior Publication Data

US 2008/0166115 A1    Jul. 10, 2008

(51) Int. Cl.
G03B 17/00    (2006.01)
(52) U.S. Cl. .................................... 396/55; 348/208.99
(58) Field of Classification Search ............. 396/55, 396/52, 53; 348/208.2, 208.13, 221.1, 208.99
See application file for complete search history.

(56) References Cited

U.S. PATENT DOCUMENTS

| 4,510,802 A | 4/1985 | Peters |
| 4,736,629 A | 4/1988 | Cole |
| 5,251,484 A | 10/1993 | Mastache |
| 5,359,893 A | 11/1994 | Dunn |
| 5,367,631 A | 11/1994 | Levy |
| 5,415,040 A | 5/1995 | Nottmeyer |
| 5,440,326 A | 8/1995 | Quinn |
| 5,511,419 A * | 4/1996 | Dunn ...................... 73/504.08 |
| 5,574,221 A | 11/1996 | Park et al. |
| 5,629,988 A * | 5/1997 | Burt et al. ................... 382/276 |
| 5,635,638 A | 6/1997 | Geen |
| 5,698,784 A | 12/1997 | Hotelling |
| 5,703,293 A | 12/1997 | Zabler et al. |
| 5,703,623 A | 12/1997 | Hall et al. |
| 5,734,373 A | 3/1998 | Rosenberg et al. |
| 5,780,740 A | 7/1998 | Lee et al. |

(Continued)

FOREIGN PATENT DOCUMENTS

EP    0429391    8/1995

OTHER PUBLICATIONS

Oboe, R., Lasalandra, E., White, M. M. MEMS-based Accelerometers and their Application to Vibration Suppression in Hard Disk Drives. MEMS/NEMS Handbook Techniques and Applications vol. 4, Springer 2006, pp. 1-29 see pp. 7-22.

(Continued)

*Primary Examiner*—Clayton E. LaBalle
*Assistant Examiner*—Linda B Smith
(74) *Attorney, Agent, or Firm*—Sawyer Law Group, P.C.

(57) ABSTRACT

Methods and apparatus for electronically stabilizing an image captured by a device including a motion detection unit are provided. In one implementation, the method includes capturing a first exposure of the image, and capturing a second exposure of the image including using the motion detection unit to ensure that the second exposure of the image has a pre-determined blur property. The second exposure is longer than the first exposure. The method further includes combining the second exposure of the image having the pre-determined blur property and the first exposure of the image to electronically stabilize the image captured by the device.

21 Claims, 12 Drawing Sheets

U.S. PATENT DOCUMENTS

| | | | |
|---|---|---|---|
| 5,825,350 | A | 10/1998 | Case, Jr. |
| 5,895,850 | A | 4/1999 | Buestgens |
| 5,898,421 | A | 4/1999 | Quinn |
| 5,955,668 | A | 9/1999 | Hsu et al. |
| 5,992,233 | A | 11/1999 | Clark |
| 5,996,409 | A | 12/1999 | Funk et al. |
| 6,067,858 | A * | 5/2000 | Clark et al. ............... 73/504.16 |
| 6,122,961 | A | 9/2000 | Geen et al. |
| 6,134,961 | A | 10/2000 | Touge et al. |
| 6,158,280 | A | 12/2000 | Nonomura |
| 6,189,381 | B1 | 2/2001 | Huang et al. |
| 6,230,564 | B1 | 5/2001 | Matsunaga et al. |
| 6,250,156 | B1 | 6/2001 | Seshia et al. |
| 6,250,157 | B1 | 6/2001 | Touge |
| 6,269,254 | B1 | 7/2001 | Mathis |
| 6,279,043 | B1 | 8/2001 | Hayward et al. |
| 6,292,170 | B1 | 9/2001 | Chang et al. |
| 6,343,349 | B1 | 1/2002 | Braun et al. |
| 6,370,937 | B2 | 4/2002 | Hsu |
| 6,374,255 | B1 | 4/2002 | Peurach et al. |
| 6,386,033 | B1 | 5/2002 | Negoro |
| 6,391,673 | B1 | 5/2002 | Ha et al. |
| 6,424,356 | B2 | 7/2002 | Chang et al. |
| 6,429,895 | B1 | 8/2002 | Onuki |
| 6,430,998 | B2 | 8/2002 | Kawai et al. |
| 6,480,320 | B2 | 11/2002 | Nasiri |
| 6,481,283 | B1 | 11/2002 | Cardarelli |
| 6,481,284 | B2 | 11/2002 | Geen et al. |
| 6,481,285 | B1 | 11/2002 | Shkel et al. |
| 6,487,369 | B1 | 11/2002 | Sato |
| 6,487,908 | B2 | 12/2002 | Geen et al. |
| 6,494,096 | B2 | 12/2002 | Sakai et al. |
| 6,508,122 | B1 | 1/2003 | McCall et al. |
| 6,508,125 | B2 | 1/2003 | Otani |
| 6,513,380 | B2 | 2/2003 | Reeds, III et al. |
| 6,520,017 | B1 | 2/2003 | Schoefthaler et al. |
| 6,533,947 | B2 | 3/2003 | Nasiri et al. |
| 6,573,883 | B1 | 6/2003 | Bartlett |
| 6,636,521 | B1 | 10/2003 | Guillianelli |
| 6,646,289 | B1 | 11/2003 | Badehi |
| 6,668,614 | B2 | 12/2003 | Itakura |
| 6,720,994 | B1 * | 4/2004 | Grottodden et al. ...... 348/208.6 |
| 6,725,719 | B2 | 4/2004 | Cardarelli |
| 6,758,093 | B2 | 7/2004 | Tang et al. |
| 6,794,272 | B2 | 9/2004 | Turner et al. |
| 6,796,178 | B2 | 9/2004 | Jeong et al. |
| 6,823,733 | B2 | 11/2004 | Ichinose |
| 6,834,249 | B2 | 12/2004 | Orchard |
| 6,845,669 | B2 | 1/2005 | Acar et al. |
| 6,848,304 | B2 | 2/2005 | Geen |
| 6,859,751 | B2 | 2/2005 | Cardarelli |
| 6,860,150 | B2 | 3/2005 | Cho |
| 6,892,575 | B2 | 5/2005 | Nasiri et al. |
| 6,915,693 | B2 | 7/2005 | Kim et al. |
| 6,918,297 | B2 | 7/2005 | MacGugan |
| 6,918,298 | B2 | 7/2005 | Park |
| 6,938,484 | B2 | 9/2005 | Najafi et al. |
| 6,939,473 | B2 | 9/2005 | Nasiri et al. |
| 6,955,086 | B2 | 10/2005 | Yoshikawa et al. |
| 6,963,345 | B2 | 11/2005 | Boyd et al. |
| 6,972,480 | B2 | 12/2005 | Zilber et al. |
| 6,981,416 | B2 | 1/2006 | Chen et al. |
| 7,004,025 | B2 | 2/2006 | Tamura |
| 7,028,547 | B2 | 4/2006 | Shiratori et al. |
| 7,036,372 | B2 | 5/2006 | Chojnacki et al. |
| 7,040,163 | B2 | 5/2006 | Shcheglov et al. |
| 7,057,645 | B1 | 6/2006 | Hara et al. |
| 7,077,007 | B2 | 7/2006 | Rich et al. |
| 7,104,129 | B2 | 9/2006 | Nasiri et al. |
| 7,121,141 | B2 | 10/2006 | McNeil |
| 7,154,477 | B1 | 12/2006 | Hotelling et al. |
| 7,158,118 | B2 | 1/2007 | Liberty |
| 7,159,442 | B1 | 1/2007 | Jean |
| 7,168,317 | B2 | 1/2007 | Chen |
| 7,180,500 | B2 | 2/2007 | Marvit et al. |
| 7,196,404 | B2 | 3/2007 | Schirmer et al. |
| 7,210,351 | B2 | 5/2007 | Lo et al. |
| 7,222,433 | B2 | 5/2007 | Mao et al. |
| 7,222,533 | B2 | 5/2007 | Mao et al. |
| 7,236,156 | B2 | 6/2007 | Liberty et al. |
| 7,239,301 | B2 | 7/2007 | Liberty et al. |
| 7,240,552 | B2 | 7/2007 | Acar et al. |
| 7,247,246 | B2 | 7/2007 | Nasiri et al. |
| 7,250,112 | B2 | 7/2007 | Nasiri et al. |
| 7,258,011 | B2 | 8/2007 | Nasiri et al. |
| 7,260,789 | B2 | 8/2007 | Hunleth et al. |
| 7,262,760 | B2 | 8/2007 | Liberty |
| 7,284,430 | B2 | 10/2007 | Acar et al. |
| 7,290,435 | B2 | 11/2007 | Seeger et al. |
| 7,333,087 | B2 | 2/2008 | Soh et al. |
| 7,352,567 | B2 | 4/2008 | Hotelling et al. |
| 7,377,167 | B2 | 5/2008 | Acar et al. |
| 7,386,806 | B2 | 6/2008 | Wroblewski |
| 7,414,611 | B2 | 8/2008 | Liberty |
| 7,424,213 | B2 * | 9/2008 | Imada ........................ 396/55 |
| 7,442,570 | B2 | 10/2008 | Nasiri et al. |
| 7,458,263 | B2 | 12/2008 | Nasiri et al. |
| 7,508,384 | B2 | 3/2009 | Zhang et al. |
| 7,621,183 | B2 | 11/2009 | Seeger et al. |
| 7,677,099 | B2 | 3/2010 | Nasiri et al. |
| 2002/0189351 | A1 | 12/2002 | Reeds et al. |
| 2003/0159511 | A1 | 8/2003 | Zarabadi et al. |
| 2004/0066981 | A1 * | 4/2004 | Li et al. ...................... 382/286 |
| 2004/0160525 | A1 | 8/2004 | Kingetsu et al. |
| 2004/0179108 | A1 | 9/2004 | Sorek et al. |
| 2005/0066728 | A1 | 3/2005 | Chojnacki |
| 2005/0110778 | A1 | 5/2005 | Ayed |
| 2005/0212751 | A1 | 9/2005 | Marvit et al. |
| 2006/0017837 | A1 | 1/2006 | Sorek et al. |
| 2006/0032308 | A1 | 2/2006 | Acar et al. |
| 2006/0033823 | A1 * | 2/2006 | Okamura ..................... 348/254 |
| 2006/0061545 | A1 | 3/2006 | Hughes et al. |
| 2006/0115297 | A1 | 6/2006 | Nakamaru |
| 2006/0119710 | A1 * | 6/2006 | Ben-Ezra et al. ....... 348/208.99 |
| 2006/0139327 | A1 | 6/2006 | Dawson et al. |
| 2006/0164382 | A1 | 7/2006 | Kulas et al. |
| 2006/0164385 | A1 | 7/2006 | Smith et al. |
| 2006/0185502 | A1 | 8/2006 | Nishitani et al. |
| 2006/0187308 | A1 * | 8/2006 | Lim et al. ................. 348/208.4 |
| 2006/0251410 | A1 * | 11/2006 | Trutna ......................... 396/55 |
| 2007/0035630 | A1 * | 2/2007 | Lindenstruth et al. .. 348/208.99 |
| 2007/0113207 | A1 | 5/2007 | Gritton |
| 2007/0146325 | A1 | 6/2007 | Poston et al. |
| 2007/0176898 | A1 | 8/2007 | Suh |
| 2008/0009348 | A1 | 1/2008 | Zaleweski et al. |
| 2008/0088602 | A1 | 4/2008 | Hotelling |
| 2008/0134784 | A1 | 6/2008 | Jeng et al. |
| 2008/0158154 | A1 | 7/2008 | Liberty et al. |
| 2008/0314147 | A1 | 12/2008 | Nasiri et al. |
| 2009/0088204 | A1 | 4/2009 | Culbert et al. |

OTHER PUBLICATIONS

Singh, Amit, "The Apple Motion Sensor as a Human Interface Device," www.kernelthread.com, 1994-2006.

Cho, et al., Dynamics of Tilt-based Browsing on Mobile Devices. CHI 2007, Apr. 28-May 3, 2007, San Jose, California, USA., pp. 1947-1952.

* cited by examiner

METHOD AND APPARATUS FOR PRODUCING A SHARP IMAGE FROM A HANDHELD DEVICE CONTAINING A GYROSCOPE

FIELD OF THE INVENTION

The present invention relates generally to digital photography, and more particularly to electronic image stabilization.

BACKGROUND OF THE INVENTION

A common problem associated with capturing images with a handheld device (e.g., a camera phone) is that the images often become blurred (or distorted) as a result of the shaking of the handheld device due to hand jitter. Hand jitter is fundamental to human biology, and generally cannot be trained away, even for a professional photographer. The amount of blur in an image depends on many factors, including the amount of shaking and the length of the exposure time. Devices with low mass will tend to shake more, and devices with smaller pixels generally require longer exposure times. Current trends in handheld image capturing devices lead toward smaller and smaller units with smaller pixels, exacerbating the problem associated with blurred images. The consumer demand for higher pixel densities and optical zoom capabilities also increases the problem. For example, for a VGA resolution image capture system, a certain blur may be too small to be visible; but for a 3 MP (megapixel) image capturing system, the same blur will be easily apparent.

Various image stabilization techniques have been proposed to deal with distortion in an image. Image stabilization techniques can be generally categorized as optical image stabilization (OIS)—in which a lens or image sensor is mechanically moved in order to compensate for the shaking of a handheld device, digital image stabilization (DIS)—in which pure software is used to remove blur (or other distortion) from an image, or electronic image stabilization (EIS)—in which information from, e.g., a gyroscope, is used to augment a software algorithm to provide a stable image. Optical image stabilization is generally considered the most effective method for producing stable images as the technique mechanically prevents an image from becoming blurred through the use of actuators. However, conventional actuators are generally too large and expensive for adoption into smaller consumer devices such as camera phones. Convention digital image stabilization techniques for removing blur from an image using pure software requires substantial processing, and often results in images that are not useable.

With regard to electronic image stabilization, conventional systems typically read a series of images (or frames) from an image sensor, shift the images using gyroscope data, and combine the images to produce a single sharp image. However, such systems are limited by the read-out time of the image sensor and suffer non-linearities in pixel integration. For example, one conventional technique for combining a short exposure frame with a long exposure frame into a single frame is described in U.S. Patent Application Publication No. 2006/0017837, entitled "Enhancing Digital Photography". According to this technique, the long exposure frame is used to provide data in which there are not many details, and the short exposure frame is used to provide fine details. However, this technique discards useful data from a long exposure frame that may be used to electronically stabilize an image. In addition, the long exposure frame may contain blur properties (e.g., non-linear blur properties) that are difficult to correct.

BRIEF SUMMARY OF THE INVENTION

In general, in one aspect, this specification describes a method for electronically stabilizing an image captured by a device including a motion detection unit. In particular, the method includes capturing a first exposure of the image, and capturing a second exposure of the image including using the motion detection unit to ensure that the second exposure of the image has a pre-determined blur property. The second exposure being longer than the first exposure. The method further includes combining the second exposure of the image having the pre-determined blur property and the first exposure of the image to electronically stabilize the image captured by the device.

Implementations can include one or more of the following features. The motion detection unit can comprise one or more of a gyroscope, an accelerometer, a magnetic field sensor, an ultrasonic transducer, or an image processor. The gyroscope can comprise a microelectromechanical systems (MEMS) gyroscope, a piezo gyroscope, or a quartz gyroscope. The MEMS gyroscope can comprise a dual-axis MEMS gyroscope. Using the gyroscope to ensure that the second exposure of the image has a pre-determined blur property can include ensuring that an output reading of the gyroscope indicates a pre-determined movement of the device during the second exposure. The pre-determined movement of the device during the second exposure can correspond to a substantially linear movement of the device. Combining the second exposure of the image having the pre-determined blur property and the first exposure of the image to electronically stabilize the image captured by the device can include—performing edge detection in the second exposure of the image to detect edges that are substantially parallel to the linear movement of the device to isolate usable edges from the second exposure of the image; and combining the useable edges from the second exposure of the image with edges in the first exposure of the image that are not substantially parallel to the linear movement of the device.

Implementations can further include one or more of the following features. Performing edge detection in the second exposure of the image to detect edges that are substantially parallel to the linear movement of the device can include using an edge detection algorithm. The edge detection algorithm can comprise wavelet edge detection. The first exposure can be substantially (e.g., +/−3 ms or greater) in the range of 5 ms-50 ms and the second exposure can be approximately 4-16 times longer than the first exposure. A duration of the short exposure and a duration of the long exposure are based upon a motion of the device and ambient lighting conditions. The device can comprise one of a camera phone or a compact digital still camera. The method can further include capturing a third exposure of the image including using the motion detection unit to ensure that the third exposure of the image has the pre-determined blur property (in which the third exposure is also longer than the first exposure), and combining the second exposure of the image having the pre-determined blur property and the first exposure of the image can additionally include combining the third exposure of the image having the pre-determined blur property to electronically stabilize the image captured by the device.

In general, in another aspect, this specification describes a device including a motion detection unit, and an image generator to capture a first exposure of an image in which the first exposure is a short exposure. The image generator is operable to further capture a second exposure of the image including using the motion detection unit to ensure that the second exposure of the image has a pre-determined blur property, in which the second exposure is longer than the first exposure. The device further includes a processor to combine the second exposure of the image having the pre-determined blur property and the first exposure of the image to electronically stabilize the image.

Implementations can provide one or more of the following advantages. In one aspect, a method of electronic image stabilization (EIS) is disclosed which involves combining an understanding of gyroscopes with an understanding of image processing. In one implementation, a gyroscope is used to provide information (e.g., regarding blur properties) of an image to an image processing system without requiring extensive and unreliable image processing necessary to extract such information from the image itself. Gyroscope-based software image stabilization allows the image processing system to be more reliable, more advanced at removing large amounts of blur, use less memory and processing power, and produce higher quality images.

The details of one or more implementations are set forth in the accompanying drawings and the description below. Other features and advantages will be apparent from the description and drawings.

BRIEF DESCRIPTION OF THE DRAWINGS

Like reference symbols in the various drawings indicate like elements.

DETAILED DESCRIPTION OF THE INVENTION

The present invention relates generally to digital photography, and more particularly to electronic image stabilization. The following description is presented to enable one of ordinary skill in the art to make and use the invention and is provided in the context of a patent application and its requirements. Various modifications to implementations and the generic principles and features described herein will be readily apparent to those skilled in the art. Thus, the present invention is not intended to be limited to the implementations shown but is to be accorded the widest scope consistent with the principles and features described herein.

Figure 1:
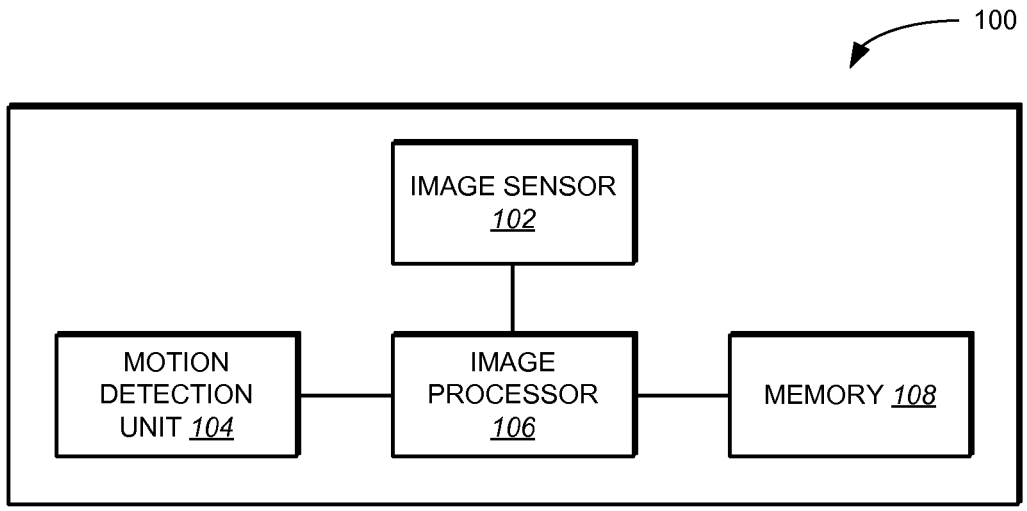
FIG. 1 is a block diagram of a device including a motion detection unit and an image sensor according to one implementation.

FIG. 1 illustrates a device 100 operable to electronically stabilize an image in accordance with one implementation. The device 100 can be any device operable to capture a digital image—e.g., a camera phone, video camera, webcam, digital still camera, or other handheld consumer device. In one implementation, the device 100 includes an image sensor 102, a motion detection unit 104, an image processor 106, and a memory 108. The image sensor 102 is operable to capture one or more frames of an image. In one implementation, the exposure time of a given frame captured by the image sensor is controlled by the motion detection unit 104. For example, if the image processor 106 requires an image frame having substantially no blur, an analysis of an output of the motion detection unit 104 can be used to determine an exposure time during which a frame can be captured such that the frame will have substantially no blur (or distortion). The motion detection unit 104 can comprise one or more of a gyroscope, an accelerometer, a magnetic field sensor, an ultrasonic sensor, or the like. In one implementation, the motion detection unit 104 is a two-axis microelectromechanical systems (MEMs) gyroscope as described in commonly owned U.S. Pat. No. 6,892,575—entitled "X-Y Axis Dual-Mass Tuning Fork Gyroscope With Vertically Integrated Electronics and Wafer-Scale Hermetic Packaging", which is incorporated herein by reference. The image processor 106 receives a plurality of frames corresponding to an image from the image sensor, and processes the plurality of frames to electronically stabilize the image, as discussed in greater detail below. The memory 108 is operable to store image frames captured by the image sensor 102.

Figure 2:
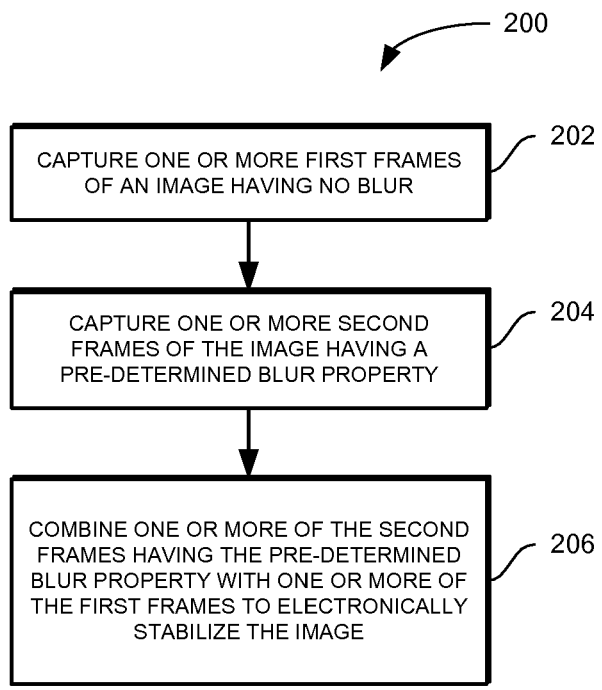
FIG. 2 illustrates a method for electronically stabilizing an image according to one implementation.

FIG. 2 illustrates a method 200 for electronically stabilizing an image using an image capturing device (e.g., device 100) according to one implementation. One or more first frames of an image are captured having substantially no blur are captured (e.g., by image sensor 102) (step 202). In one implementation, prior to capturing a frame, data from a motion detection unit (e.g., a gyroscope) is examined to determine a maximum exposure time that can provide an image having substantially no blur (e.g., an image having a pixel shift of 1 pixel or less). Such an exposure time can then be used to capture the one or more first frames of the image. In one implementation, after one or more of the first frames of an image have been captured, data from the gyroscope during a time of the exposure of a given frame can be further examined to determine whether a given frame should be discarded. That is, if the gyroscope data indicates that a frame would have a pixel shift of greater than a predefined number of pixels, then the corresponding frame can be discarded. In one implementation, the exposure time for capturing the one or more first frames of an image is substantially in the range of 5 ms-50 ms.

One or more second frames of the image are captured (e.g., by image sensor 102) having a pre-determined blur property (step 204). In one implementation, the pre-determined blur property is a substantially linear blur. More generally, the pre-determined blur property can be any blur property having known characteristics—e.g., a Gaussian blur. While any type of blur may be removed by this system, the algorithm can be faster and more effective if the type of blur is constrained. In one implementation, prior to capturing one or more second frames of the image having a pre-determined blur property, data from the motion detection unit is examined to determine a maximum exposure time that can provide an image having the pre-determined blur property. Accordingly, (in one implementation) after one or more of the second frames of an image have been captured, data from the motion detection unit during a time of the exposure of a given frame can be examined to determine whether a given frame (not having the pre-determined blur property) should be discarded. In one implementation, the exposure time for capturing the one or more second frames of the image is approximately 4-16 times longer than the first exposure.

One or more of the first frames of the image are combined with one or more of the second frames of the image (e.g., by image processor 106) to electronically stabilize the image (step 206). In an implementation in which the pre-determined blur is a substantially linear blur, the image processor performs edge detection in the one or more second frames of the image to detect edges that are substantially parallel to the linear blur to isolate usable edges from the one or more second frames of the image. That is with a substantially linear blur, sharp edges can be retrieved from one or more of the second frames of the image that are in the direction of the blur, as such edges are not blurred. The edge detection may be at a single scale, or at multiple scales. In one implementation, data from the motion detection unit is used to determine a direction of the blur associated with a given second frame of the image. A point spread function (PSF) can also used (in conjunction with data from the motion detection unit) to determine blur characteristics of a given image frame, as discussed in greater detail below. Thus, the useable edges from the one or more second frames of the image can be combined (by the image processor) with edges in the one or more first frames of the image to substantially remove blur (or distortion) from the captured image. Such a technique requires less processing relative to conventional techniques that discard all edge information associated with frames of an image captured using a longer exposure time.

Figure 3:
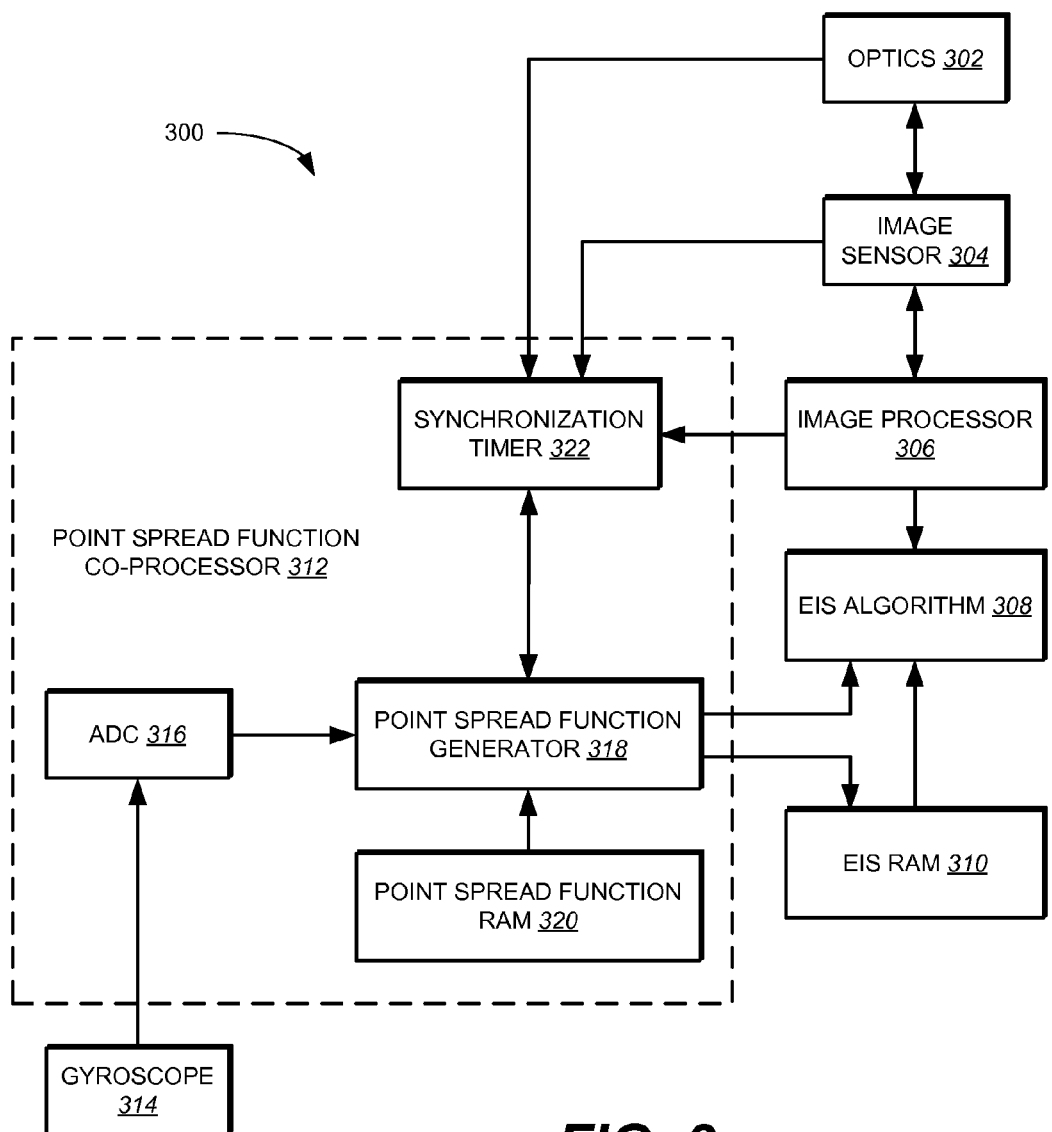
FIG. 3 is a block diagram of a camera phone according to one implementation.

FIG. 3 illustrates a block diagram of a camera phone 300 in accordance with one implementation. The camera phone 300 includes optics 302, an image sensor 304, an image processor 306, an electronic image stabilization (EIS) algorithm 308, an EIS RAM 310, a point spread function (PSF) co-processor 312, and a gyroscope 314. In one implementation, the point spread function co-processor 312 includes an analog-to-digital converter (ADC) 316, a point spread function generator 318, a point spread function RAM 320, and a synchronization timer 322. In one implementation, the optics 304 comprises a lens to gather incoming light and to focus an image, or part of the image. The image sensor 304 converts a visual image into an electrical signal. In one implementation, the image sensor 304 includes an array of charge-coupled devices (CCD) or CMOS sensors such as active pixel sensors. The gyroscope 314 can comprise a MEMS gyroscope including, for example, a dual-axis gyroscope with integrated amplification and high-pass filters, or a single chip, six-axis inertial measurement unit that contains a tri-axis gyroscope and a tri-axis accelerometer. The point spread function generator 318 (of the point spread function co-processor 312) generates a point spread function that corresponds to blur an image captured by the image sensor 304. The synchronization timer 322 permits the image processor 306 to correlate data from the gyroscope 314 with a given frame captured by the image sensor 304. In one implementation, the data (e.g., yaw and pitch) from the gyroscope 314 is analog and, therefore, the point spread function co-processor 312 includes the ADC 316 to sample the analog data output from the gyroscope 314.

Figure 13:
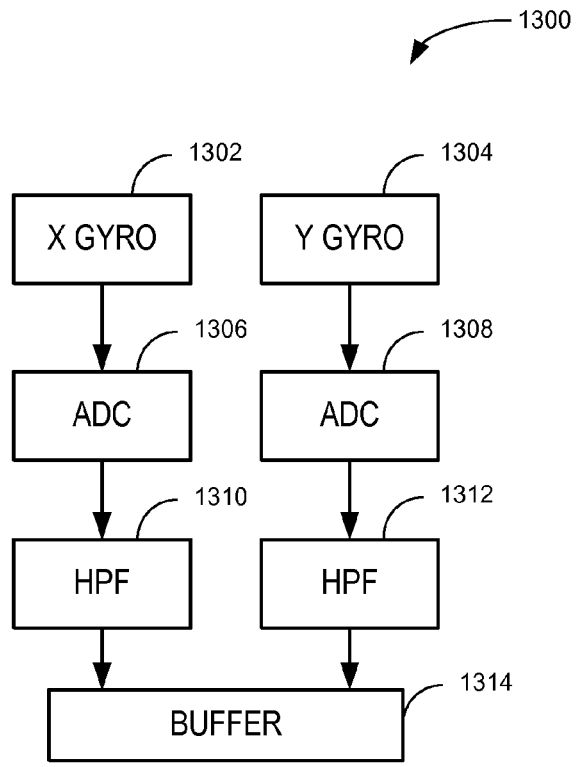
FIG. 13 illustrates a system for storing the gyroscope data in accordance with one implementation.

FIG. 13 illustrates a system 1300 required for storing the gyroscope data in a buffer. In one implementation, the gyro data is analog in nature and, therefore, analog signals (e.g., pitch data and yaw data) output from the X gyroscope 1302 and the Y gyroscope 1304 are first digitized by analog-to-digital-converters (ADCs) 1306, 1308. After the pitch and yaw data have been sampled by ADCs 1306, 1308, the pitch and yaw data are high-pass filtered with high-pass filters 1310 1312, e.g., to remove DC bias errors, and stored in a buffer 1314. The high-pass filters 1310 1312 may use a single time constant, or a variable time constant depending upon application requirements.

Figure 4:
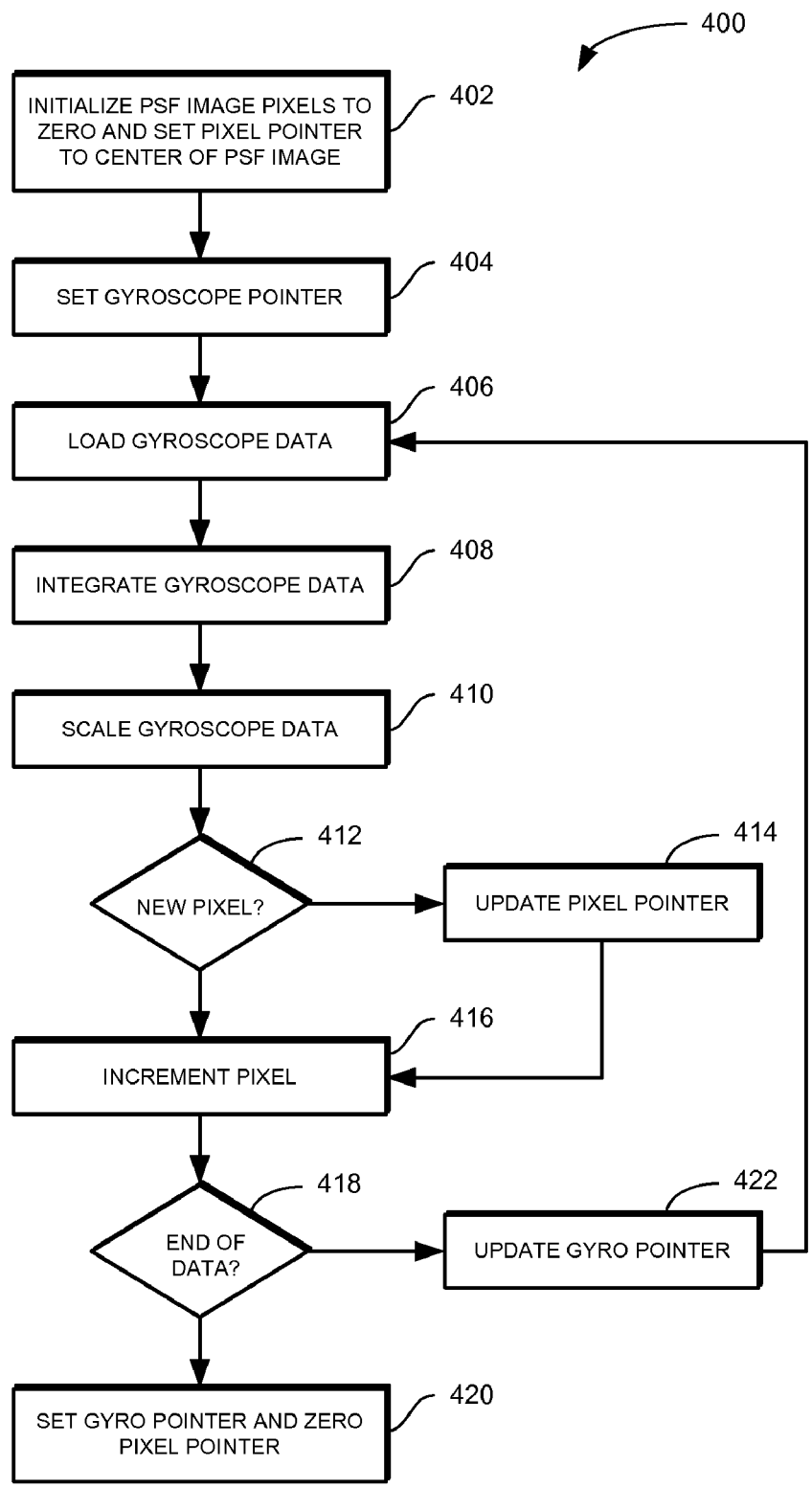
FIG. 4 illustrates a method corresponding to an EIS algorithm for generating a point spread function based on data from a gyroscope in accordance with one implementation.

FIG. 4 illustrates a method 400 corresponding to an EIS algorithm (e.g., EIS algorithm 308) for generating a point spread function based on data from the gyroscope 314 in accordance with one implementation. In one implementation, generating a point spread function from gyroscope data requires estimating a small, grayscale image that represents a blur that would occur if a single point of light were captured during a detected motion of an image capturing system (e.g., camera phone 300). The method 400 begins with initializing all pixels of a point spread function (PSF) image to zero and setting a pixel pointer to the center of the PSF image (step 402). A gyroscope pointer is set to point to gyroscope data corresponding to the start time of an exposure period (step 404). The gyroscope data (corresponding to the start time of an exposure period) is then loaded, e.g., into a point spread function generator (step 406). The gyroscope data is then integrated through an integrator (step 408), and scaled by a scale factor (step 410). The integrator may implement a single time constant or a variable time constant depending on application requirements. In one implementation, the scale factor depends on the optical system and zoom level, and the angular gyroscope data by the number of pixels per degree. In one implementation, the gyroscope data represents the angular motion of the image capturing system.

A determination is made whether the gyroscope data indicates that the image capturing system has moved by more than one pixel (i.e., there is a new pixel) (step 412), and if so, the X and Y coordinates associated with the pixel pointer are moved according to the amounts indicated by the yaw and pitch gyroscope data (step 414). The pixel value is incremented as indicated by the pixel pointer—i.e., the pixel being incremented is the pixel currently being pointed to by the pixel pointer within the point spread function (step 416). A determination is made whether the end of data has been reached (step 418), and if so, the point spread function frame shift is output from the point spread function generator (step 420). Otherwise, the gyroscope pointer is updated (step 422), and the method 400 returns to step 406, as discussed above. This is repeated until the gyroscope pointer has incremented through all of the gyroscope data corresponding to the exposure time of the image. In addition to providing the PSF corresponding to the motion of an image capturing system during an exposure time, the gyroscope can provide the shift of the image capturing system between two exposure times. In this case, it is not necessary to perform the complete PSF calculation; instead, the scaled gyroscope data can be used directly. After integrating and scaling the gyroscope data during the time between exposure times, the difference between the first and last values provides the total shift of the image capturing system.

Figure 5:
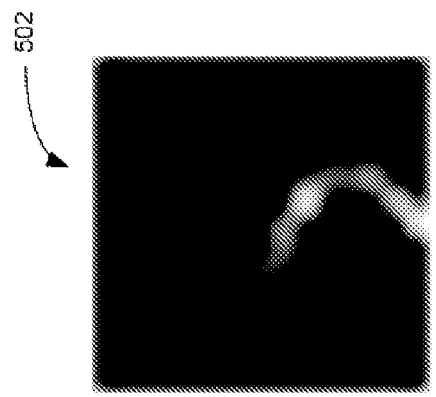
FIG. 5 illustrates an example of a blurred image having double edges.
Figure 5:
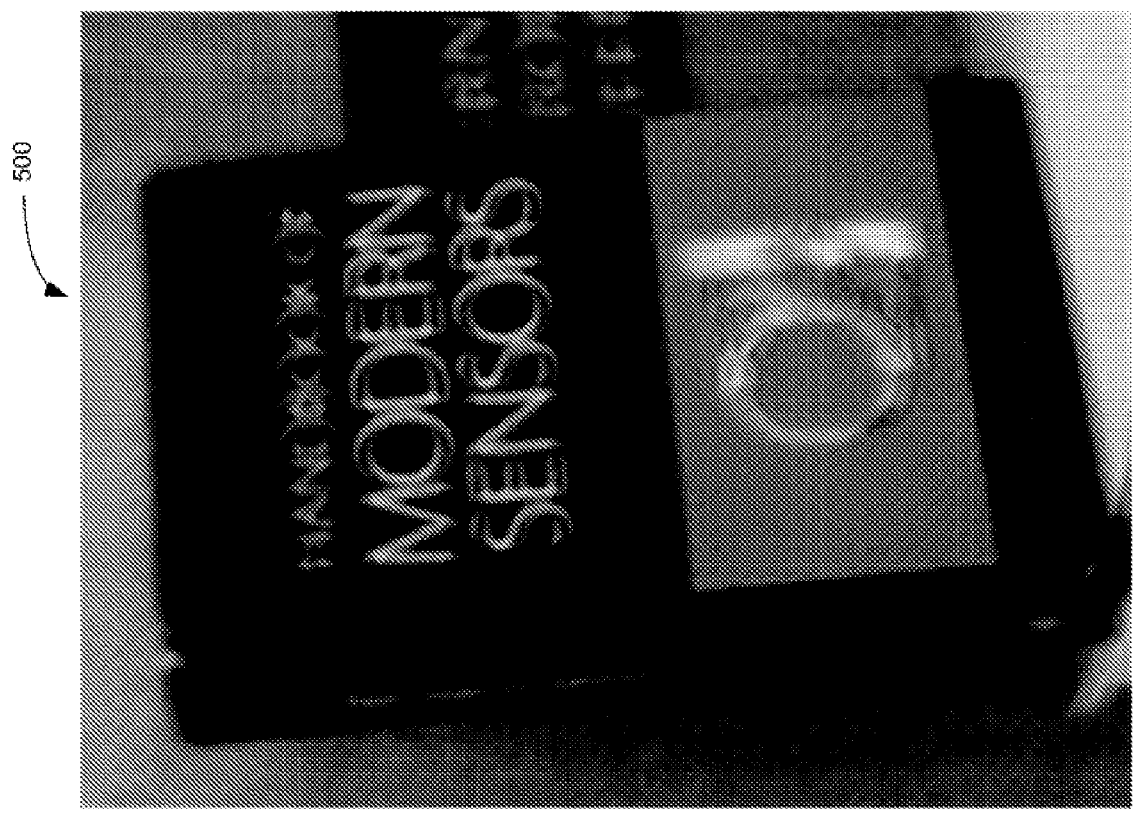

The PSF contains useful information about the image that can be used at various points within the system. When aligning two frames, in addition to knowing the shift between the frames, it is necessary to locate the brightest points of the two PSFs, and their deviations from the center of the PSF. The total amount an image should be shifted in order to line up with another image is equal to the deviation from the center of the brightest point of the first PSF, plus the total shift of the image capturing system between the two frames, plus the total deviation from the center of the brightest point of the second PSF. In some cases, blurry images cause edges to separate into double edges, as is shown in the image 500 of FIG. 5. This effect happens often when the total blur of the image is greater than three pixels. This effect causes a great deal of trouble for image alignment techniques that rely on edge detection, feature tracking, or cross correlation, because the number of edges has increased. This double edge phenomenon can be detected using the gyroscope PSF image 502 (shown in FIG. 5) due to the presence of two bright points in the PSF image 502. Alignment can still be obtained by finding the maximum point in the PSF image and aligning the frames based on this point. This allows the edges of a short frame to be aligned with one set of edges in the long frame.

Figure 6:
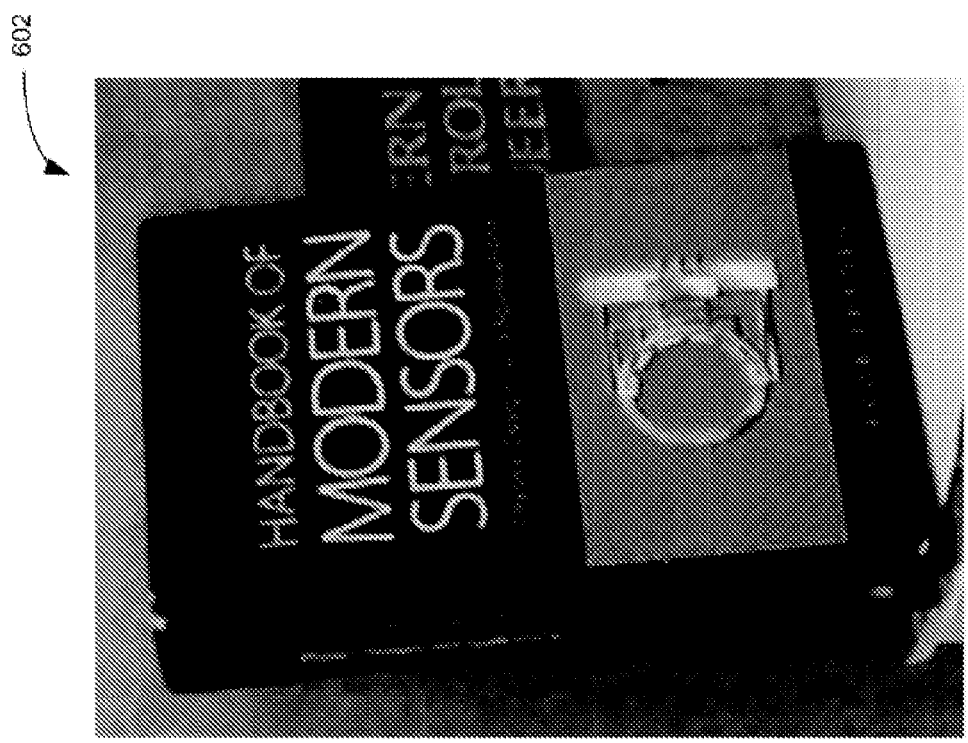
FIG. 6 illustrates an example of a point spread function (PSF) image.
Figure 6:
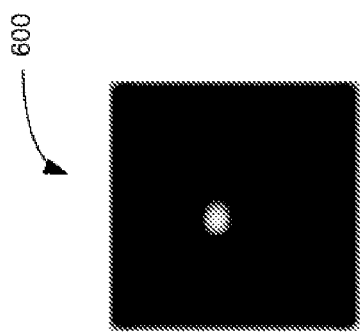
Figure 7:
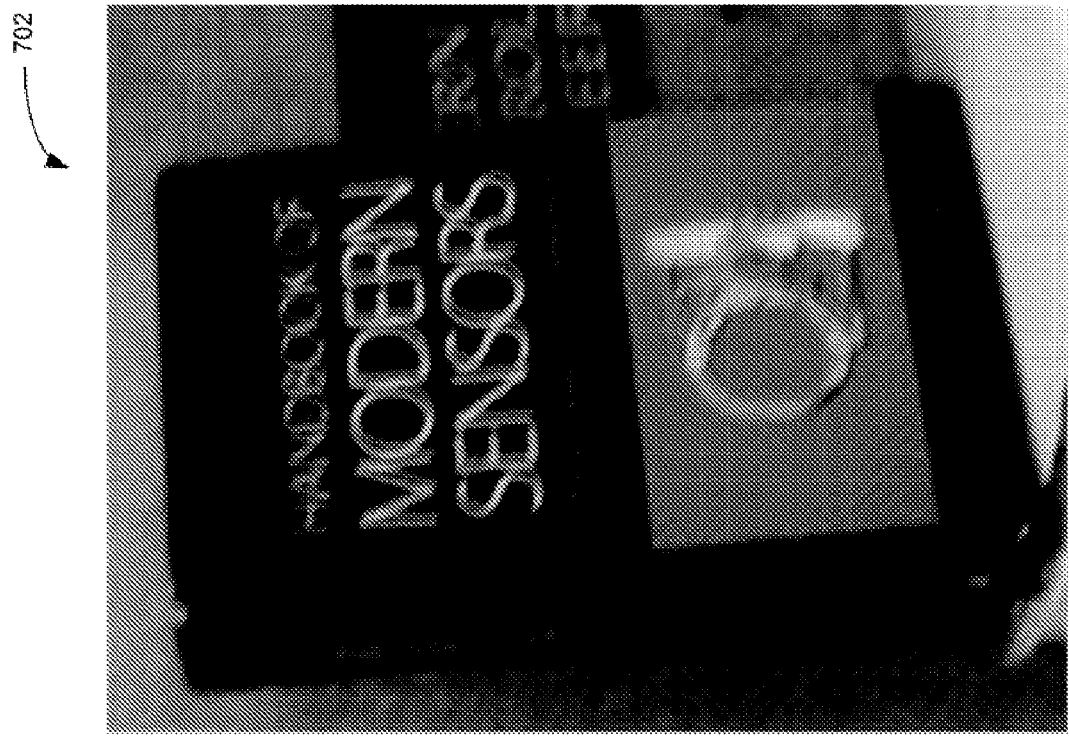
FIG. 7 illustrates another example of a point spread function (PSF) image.
Figure 7:
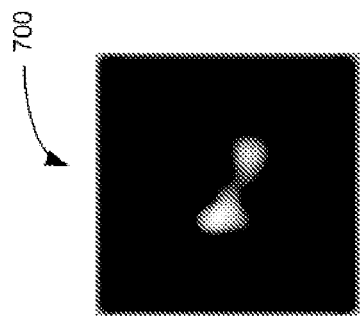

The PSF can also be used to determine a type of blur contained in a given frame of an image. For example, referring to FIG. 6, as the PSF image 600 looks like a small, bright spot, the corresponding image 602 will be sharp. If the PSF image is a circularly symmetric, spread out spot, the corresponding image will be uniformly blurred as if by a Gaussian convolution. If the PSF looks like a line, as shown by the PSF image 700 of FIG. 7, the corresponding image 702 will be blurred in the direction of that line. This means that lines perpendicular to the PSF will have blurred, but lines in the same direction as the PSF will still be sharp. If the PSF image has a bright, concentrated spot and a long tail, like a comet, the corresponding image will not look blurry in the normal sense, but will appear sharp with some ghosting. Depending on the response of the image capturing system, this ghosting may not even be visible. Careful calibration of an image capturing system can determine that such PSF images are actually acceptable, and no further image processing is required. If a PSF image has more than one bright spot, the edges in the corresponding image will have separated into multiple edges, which is a common phenomenon that makes image alignment extremely difficult without a gyroscope.

With a tri-axis gyroscope or six-axis IMU (Inertial Measurement Unit), the rolling motion of the image capturing system can also be determined. This creates PSFs that vary throughout the frame. If the image capturing system rolls about the center of the image, the PSF at the center will be a bright spot, but the PSFs at the edges of the image will be elongated. In the motion is creating unacceptable blur, the edges of the image may have to be processed differently from the center of the image, and then stitched together with the center of the image using methods that are well known in the art. This is especially true for systems that have a very wide field of view.

With a six-axis IMU, the linear motion of the image capturing system can also be interpreted. The vertical and horizontal translation can be coupled directly into the PSF generation if the distance to the object being captured is known. This has a negligible effect on the PSF of the object being photographed is more than a couple feet away, but for close-ups this effect becomes more important. With a six-axis IMU, the forward-backward motion of the image capturing system can also be used to determine a more accurate PSF. This motion usually has a negligible effect on the image. Like the roll of the image capturing system, it causes no change to the PSF at center of the image, but some outward movement of the PSF near the edges of the image. The edges of the image may have to be processed separately, and stitched together with the center of the image using methods that are well known in the art.

When a rolling shutter is present, it is certain that the PSF will vary extensively throughout the image. As each row of the image is exposed at a slightly different time than the other rows, each row will have experienced slightly different movement. In this case, it will be necessary to split the image into segments, and process the segments separately, and then stitch the segments together (e.g., using conventional techniques). For example, it is often the case with a rolling shutter that for some part of the image, the PSF becomes very small and concentrated. This part of the image is already sharp, and requires no further processing. The other parts of the image should be processed, and then the image can be stitched back together.

In general, rolling shutters are undesirable because they introduce artifacts into images. With a low frame rate, even a short exposure image that is not blurry may have strong rolling shutter artifacts, causing objects to change shape within the image. For example, on a bright sunny day, an exposure time may be as short as 2 ms, and no blur will be present. However, with a frame rate of 5 fps, the time between the exposure of the top of an image and the bottom of an image will be 200 ms, during which the camera will have shifted a significant amount. This is the main reason why mechanical shutters are desired, although they introduce additional cost to a camera system. In addition, these artifacts make any multiple frame technique impossible. Frames cannot be aligned by simply shifting the images once along the X axis and once along the Y axis, because objects have actually changed shape within the images. With a gyroscope, the rolling shutter artifacts can be removed, making frame alignment possible, and reducing the need for a mechanical shutter. Rolling shutter compensation allows enables many multiple frame techniques to be used without mechanical shutters, including dynamic range imaging and red-eye reduction. In addition to enabling multiple frame techniques, rolling shutter compensation can improve the quality of a single frame by changing objects back to their original shapes.

In one implementation, the gyroscope data is integrated between the time of the first row and the time of each additional row. For each row, that row is shifted individually by the amount indicated by the gyroscope data. In one implementation, the upward and downward shifts are implemented in real-time. An upward shift of one pixel is done by writing over the last row with the new row, and a downward shift of one pixel is done by writing the incoming row twice. Shifts of more than one pixel can be accomplished by writing over multiple rows for an upward shift, and writing the incoming row multiple times for a downward shift. The left and right shifts can also be implemented in real-time by writing the row to memory with its starting point at some location other than the first memory location for that row. In one implementation, the rows are shifted using bilinear shifting, which removes some jagged artifacts that may otherwise be introduced by rolling shutter compensation.

Figure 8:
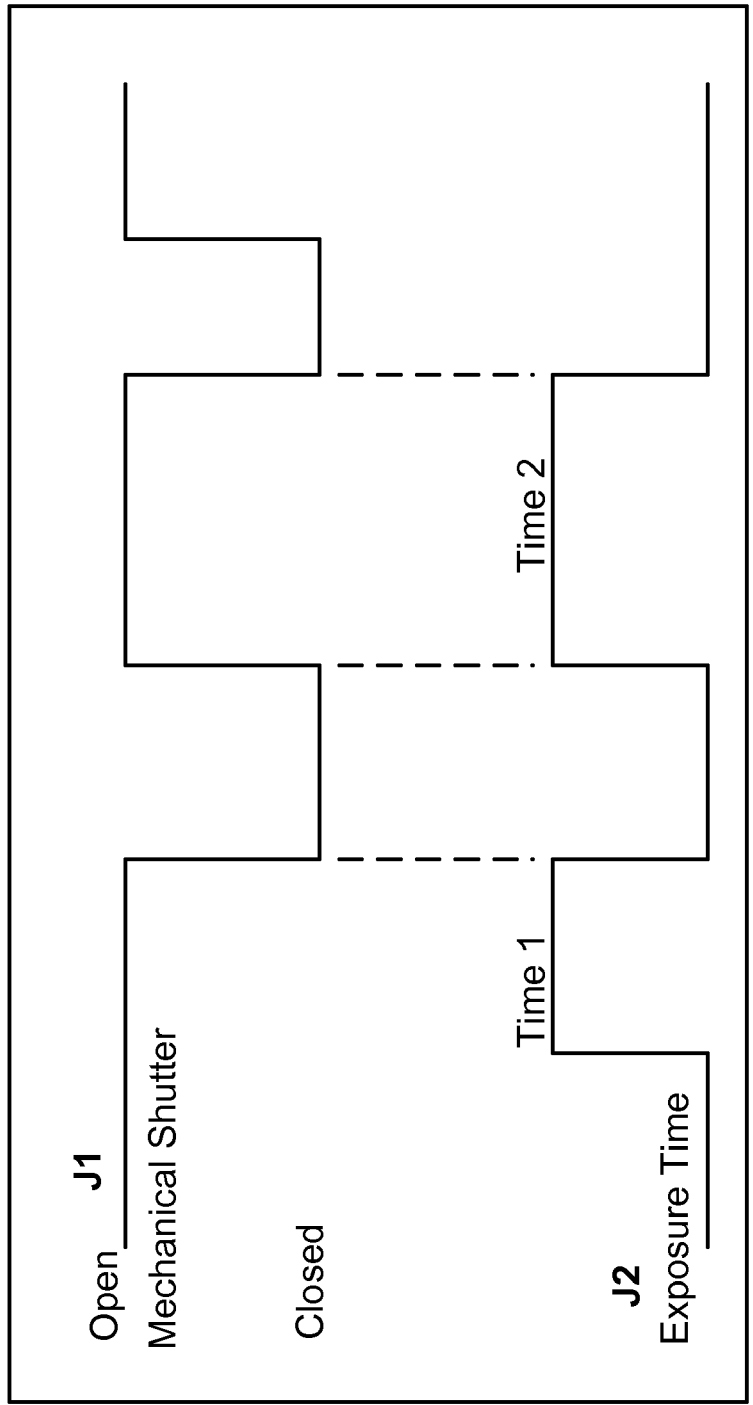
FIG. 8 illustrates timing of a mechanical shutter relative to exposure time.

Careful synchronizing of the gyroscope data and the image data is extremely important. Hand jitter typically ranges from 3 Hz to 8 Hz, but can contain frequencies as high as 20 Hz. The timing of the gyroscope data relative to the timing of the exposure of the images should be known to 1 or 2 ms. In one implementation, a mechanical shutter is used. This makes synchronization relatively simple, if the exposure times and shutter signal is known. The timing is shown in FIG. 8. In one implementation, the controller that stores the gyroscope data also samples the signal tied to the mechanical shutter, and stores that as well. This way the state of the shutter is known to the same accuracy as the sample rate of the gyroscope. In digital image capturing systems, the shutter closes at the end of an exposure period, but does not open at the beginning of the exposure period. Typically, the sensor is already exposed to light, in a preview mode that allows the user to frame a shot. Therefore, in addition to the shutter signal, the PSF generator must have access to the exposure time chosen by the ISP or the EIS processor. For example, if the exposure time is chosen to be 200 ms, the shutter signal J1 (FIG. 8) will indicate the end of this exposure time. To find the beginning of this exposure time, the gyroscope pointer must backtrack 200 ms in the gyroscope data.

In one implementation, the PSF generator may also control the mechanical shutter. For example, for a short exposure in which it is required that no blur be present, the chosen exposure time should be determined to be short enough such that the image capturing system won't move much during this time. When a lot of hand shake is present, it maybe necessary to time the opening of the shutter carefully. For example, the image capturing system may set the analog sensor gains very high, as for a 20 ms "high ISO" shot, but set the exposure time to 100 ms. The PSF generator will then hold the shutter closed during this time and watch the gyro data carefully, and in real time, chose the best 25 ms during which to allow the shutter to open.

Figure 9:
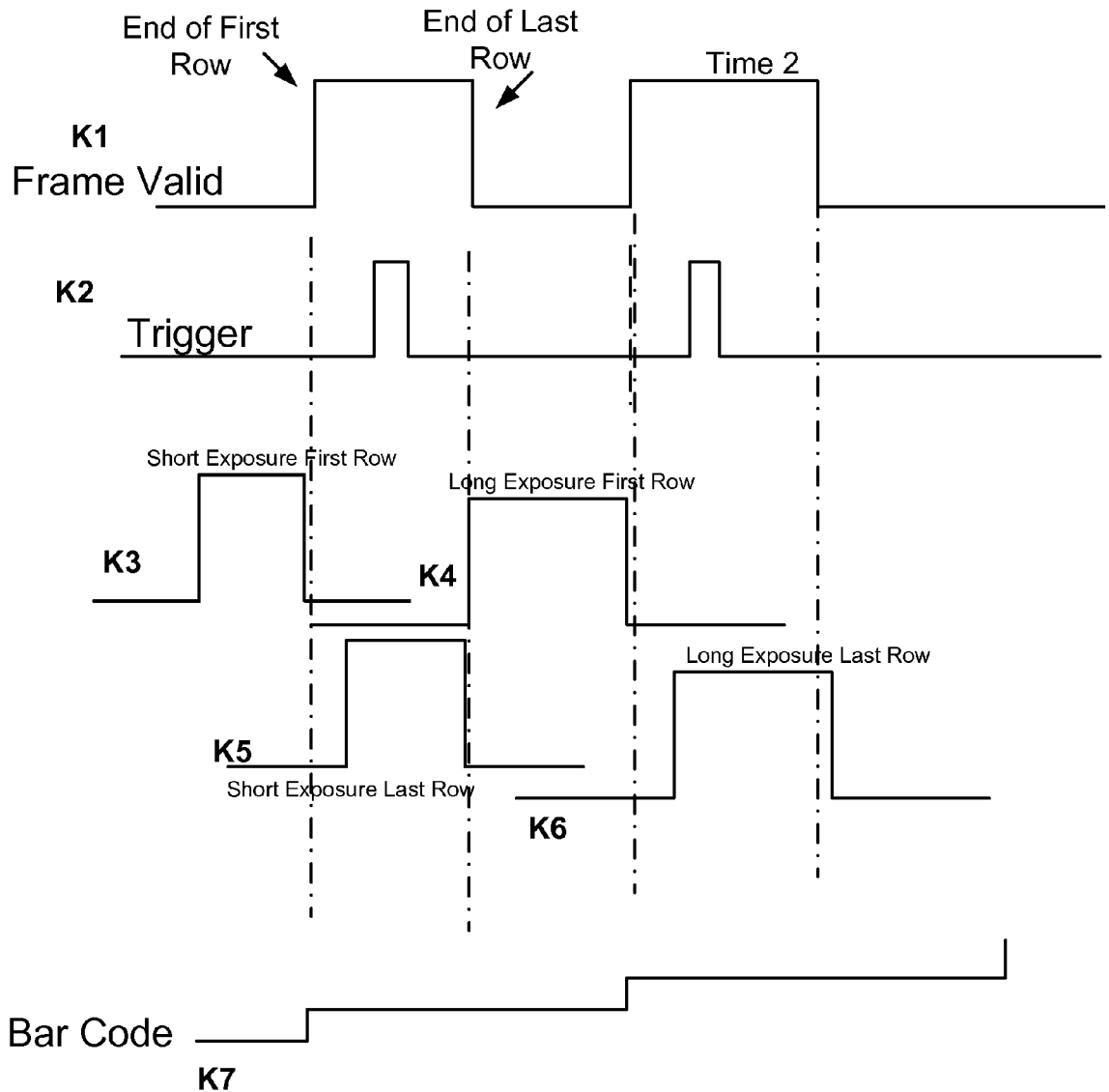
FIG. 9 illustrates timing of a rolling shutter relative to exposure time.

When no mechanical shutter is present, and a rolling shutter is used, as shown in FIG. 9, the frame valid line may be sampled instead of the mechanical shutter line. However, this makes synchronization more difficult because the frame valid line indicates the presence of every frame, including those that are not captured. In camera phones that use rolling shutters, often the only change that happens when a user captures an image is that the application processor chooses to store that image data permanently, instead of writing over it with the next image. In this case, an additional input is necessary to inform the PSF generator that an image is being stored. This trigger signal K2 can come from the processor that runs the EIS algorithm, the sensor, or the ISP.

Figure 10:
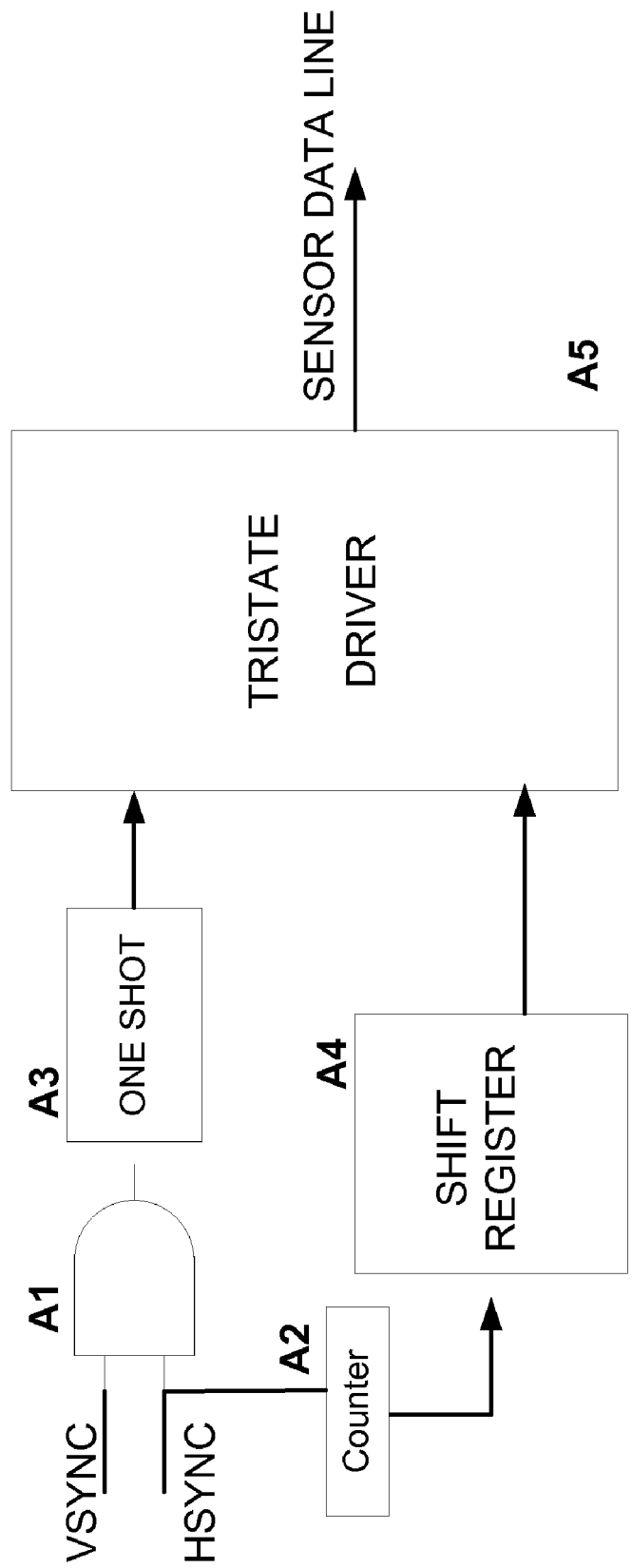
FIG. 10 is a block diagram of a time-stamping system in accordance with one implementation.
Figure 11:
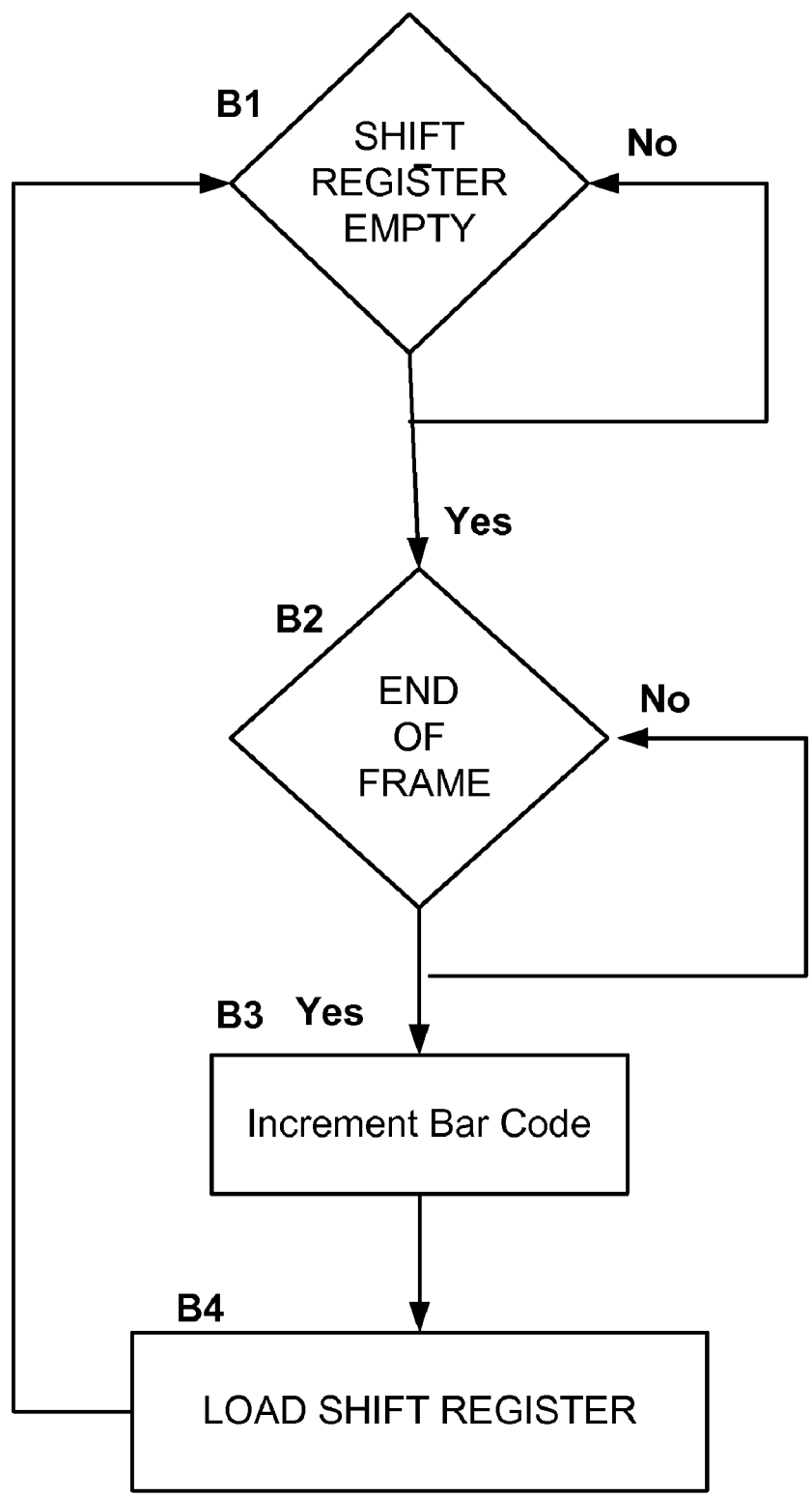
FIG. 11 illustrates a method for time stamping an image in accordance with one implementation.

In one implementation, the gyroscope data and the image data may not be easily synchronized at the time of capture. For example, if the EIS solution is designed to be a drop-in module in a system that has already been designed and has no way of easily synchronizing the images to the gyroscope data. If this system uses a rolling shutter, the frame valid line can be used to determine the timing relative to a certain frame, but will not aid the PSF generator in knowing which frame is the one that was captured. For some such systems, there may be a several second delay between the time at which the user decides to take a picture, and the time at which the system actually stores a frame. In this case, it is necessary to stamp all the images with a timestamp that allows a post-processing system to recognize which image corresponds to a certain set of gyroscope data. Such a time-stamping system, as shown in FIGS. 10 and 11, can consist of interfacing to one of the pixel data lines with a tri-state driver A5, the frame valid line, and the line valid line. During normal operation, the driver is in a floating state, and the pixel line is allowed to go high or low. However, at the beginning of each line, the pixel data line is forced high or low by the tri-state buffer, generating a timestamp on the image. This can be done through a multiplexer, such that the pixel line need not actually be shorted. However, as the pixel data lines usually have current limit, it is often sufficient to short the data line high or low with the tri-state driver.

The time stamp generation includes watching the frame valid line to determine when a frame is present, and watching the line valid line to determine the start of a line. A one-shot circuit A3 for briefly enabling the tri-state driver at the start of the line. A shift register A4 for shifting out a timestamp. A counter A2 for ensuring that each bit in the timestamp is applied to more than one line. For example, to assure some redundancy in the circuit, an 8 bit timestamp may stamp each bit onto 8 lines, creating a timestamp across a total of 256 lines. The timestamp is therefore a vertical bar across the edge of the image, typically only 1 or 2 pixels thick. This bar can be cropped later. Since the uncertainty in matching the gyroscope data to the images is only over a few seconds, it is sufficient to use an 8 bit timestamp, which ensures that over 256 frames, there will be no two frames with the same stamp. At the typical 15 fps rate, this is equivalent to about 17 seconds. In addition, it may be desirable to have the first bit be a start bit, as the timing of the system may be difficult to assure that the timestamp begins on the first line of the image.

In one implementation, when choosing exposure times, it is necessary to consider the lighting in the scene and the amount of shaking in the gyroscope data. It is first necessary to determine the desired PSF size. For an image with zero blur, such as a short exposure frame that is to be used as an edge framework, the PSF must be as small as possible, such as a small bright point that is only one or two pixels in total size. Alternatively, for long exposure images, while it may be impossible to constrain the PSF in size, it may be desire to constrain the PSF to a certain shape. For example, images with a small amount of blur may have PSFs that are Gaussian or linear, which may simplify the calculation. Other images may be rejected. The desired exposure time based on the lighting can be obtained from the autoexposure routing typically built into the sensor and ISP or SoC system.

The exposure time based on hand-shaking should be as long as possible, though no longer than the time determined by the autoexposure, unless it is desired to widen the dynamic range of the image capturing system. The exposure time based on the amount of hand shaking depends on the typical amount of movement. This can be determined experimentally by using a moving integration window over the incoming gyroscope data and determining the average number of data points that can be summed before the PSF is no longer described by the desired constraint. The standard deviation of this value is calculated to determine the longest exposure time that can be used if the desired image is not required every time. For example, rather than requiring that every incoming frame be constrained to a certain PSF, the constraints can be weakened such that only half the incoming frames follow the desired constraint. In this case, it may be necessary to capture a few frames in succession before one of them follows the desired constraint. The advantage is that the captured frame will have a longer exposure time, and therefore lower pixel noise and better color content.

In one implementation, the system uses a two frame approach in which one is long exposure and one is short exposure. The exposure time for the short is set such that about half the short images will have zero blur. The exposure time for the long is set such that about half the images will have linear or Gaussian blur. The image capturing system is then set to take pictures repeatedly until it acquires a short frame with no blur, and a long frame with Gaussian or linear blur. The final constrain is that these images must be close to each other in time, to assure that the gyroscope data will be accurate. It may take a second or two to finally capture these frames, rather than the fraction of a second required if the exposure times are set such that all incoming images obey the constraints. However, the advantage is that, once the images have arrived, they will have lower noise and better color content due to the longer exposure times that were used.

Figure 14:
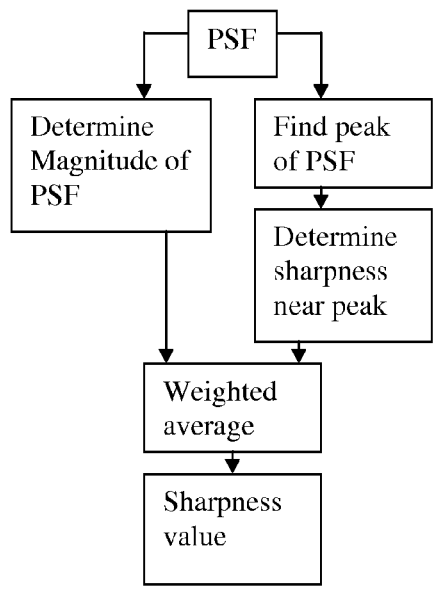
FIG. 14 illustrates example PSFs and a method for selecting a PSF in accordance with one implementation.
Figure 14:
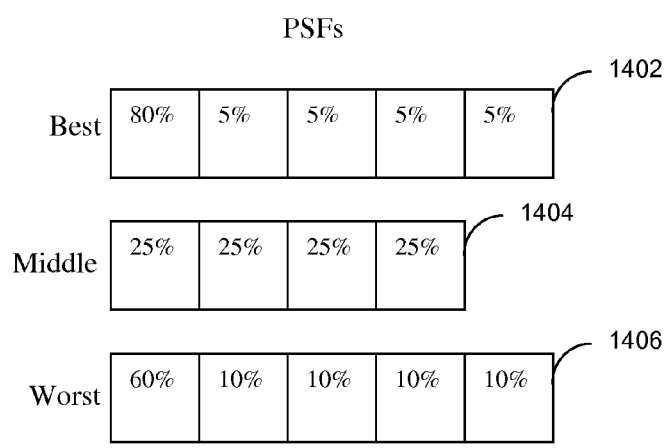

When selecting an image that is to have the least amount of blur, both the magnitude and the sharpness of the PSF must be considered. The magnitude determines the amount of rotation exhibited by the camera during the exposure time. This is not sufficient for selecting the sharpest image. For example, in FIG. 14, three PSFs 1402, 1404, 1406 are shown indicating horizontal blur. The smallest PSF (PSF 1404) indicates a blur of four pixels, but does not indicate the most desirable image. This is because the blur is evenly spread out among the four pixels. The best PSF of the three is a five pixel blur (i.e., PSF 1402), but with most of the power concentrated in a small area, indicating an image with sharp edges, but with a very faint blur on top of the edges. To select the best PSF, the sharpness must be considered along with the magnitude, in a weighted average that combines both parameters. The weights may depend on the image sensor design, and may be adjusted by the user.

Figure 12:
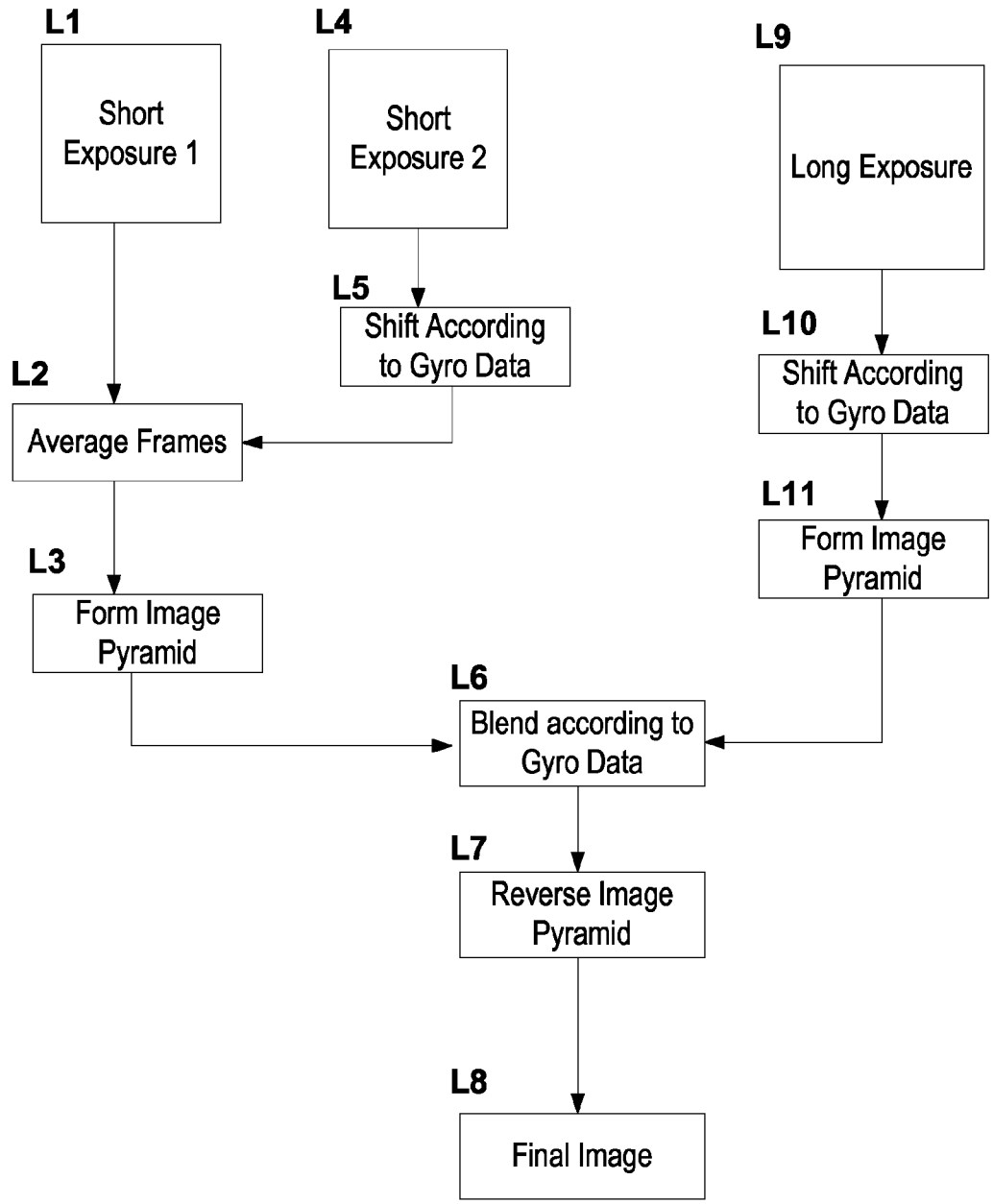
FIG. 12 illustrates a method for combining a long exposure image and a short exposure image using a wavelet transform.

In one implementation, the final image is generated by combining a short exposure image with a long exposure image. The short exposure image contains more accurate edge data, and the long exposure image contains better color content and lower pixel noise. The short exposure image may be a grayscale image. In one implementation, long exposure images and short exposure images can be combined using a wavelet transform, known as an image pyramid, as is shown in FIG. 12. The image pyramid can be generated by downsampling the image after anti-aliasing, or blurring it, to provide a scaled version of the image. This is done repeatedly until the smallest possible scaled image has been found. The amount of processing necessary to produce an effective image pyramid depends on the PSF from the gyroscope. With a large gyroscope PSF, less processing may be desired on the blurry image, since it effectively has lower resolution anyway. It may not be necessary to calculate the lowest levels of the pyramid for this image. With a Gaussian PSF, the image can be thought of as already anti-aliased down to a certain pyramid level. In this case, less processing is required because the pyramid transformation has, effectively, already begun. For certain PSFs, it may be possible to use a simpler image pyramid. For example, a PSF that has a bright spot and a blur region guarantees that the long exposure will have strong edge content. In this case, a Laplacian pyramid may be used. If the PSF does not indicate strong edge content, and the short exposure is known to contain substantial pixel noise, a more complex image pyramid can be used. In this case, four directional convolutions can be used to that expose edge content along different directions. This technique is more appropriate for distinguishing between pixel noise and edge content in the short exposure. In one implementation, if the PSF of the long exposure is small and Gaussian, the short exposure may be discarded, and a standard sharpening filter may be used on the long exposure.

If it is known in advance from the gyroscope data that there will be substantial blur in the long exposure image, pixel binning can be initiated at the sensor level, allowing the first pyramid to be done effectively at the sensor level. This reduces computation time and pixel noise. Additionally, if the gyroscope PSF is small enough for the long exposure, no further processing is necessary. The long exposure image can be used immediately as the final image. In order to blend the images without artifacts, it is necessary to first shift the images until the brightest points in their respective PSFs have been aligned. For high megapixel image capturing systems, the gyroscope may not be accurate enough to line the images up to within one or two pixels. In this case, additional image processing may be desired to complete the process down to one or two pixels. However, typically they are unreliable and require extensive processing, due to the fact that there is no known bound on the number of pixels to be shifted; for example, two images may be out of alignment by one pixel, or by one hundred pixels. With the aid from the gyroscope, the alignment problem becomes bounded, and therefore requires much less processing, and is more reliable. For example, if the gyroscope is only accurate to 3 pixels for a given image capturing system, and the frames are misaligned by 50 pixels, the gyroscope data will provide a shift of 47 to 53 pixels. The image processing may be necessary to complete the final image shift. The number of pixels to be shifted is therefore bounded by the error in the gyroscope.

After the images have been aligned as in I4, and the pyramids I2 and I5 have been constructed from the long and short exposure images, they must be blended at I6 to provide a single image that contains the best qualities of both. Image pyramids provide multi-scale low-pass and high-pass versions of the image. These filters provide a natural separation of color content and edge content. When generating the image pyramid, both first and second derivatives of the image are generated. When the first derivative has a peak, and the second derivate has a trough, a strong edge is present. This edge content can be expressed as a complex number having a magnitude and a phase, in which one dimension of the number is the first derivate, and one dimension of the number is the second derivative. In order to blend the images, both must be considered. The final magnitude of the final image can be generated as a weighted average between the magnitude of the short exposure and the magnitude of the long exposure. The final phase of the final image can be generated as a weighted average between the phase of the short exposure and the phase of the long exposure. Since the phase contains strong edge information, it should be taken mostly from the short exposure. However, it should not be taken entirely from the short exposure, as the pixel noise may also seem to be "edge" like, and it is desirable to remove this noise.

In one implementation, the weights are determined experimentally. The magnitude information should be taken from both the short and the long exposure images, with weights that can be determined experimentally. In regions with strong edge content, it may be desirable to weight the short exposure more strongly. In regions without strong edge content, it may be desirable to weight the long exposure more strongly. In the case where the PSF of the long exposure is linear, it may be desirable to weight edges differently depending on the direction. For example, edges along the same direction as the PSF will not be blurry, and these can be weighted more strongly from the long exposure. However, edges that are perpendicular to the direction of the PSF will be blurry, and should be taken more from the short exposure. The direction of the edges can be determined from the pyramid structure using conventional techniques.

Based on the shape and size of the gyroscope PSF, the algorithm may choose different look-up tables with different filter coefficients and blending weights, to optimally produce the best image quality depending on the type of blur in the long exposure. For example, if, based on the gyroscope data, a longer exposure time may be used for the short exposure image, and the gyroscope data has guaranteed that this image still contains little or no blur, then the short exposure frame should be weighted more strongly than the long exposure frame. When the blending is complete, the final image can now be constructed by using the reverse image pyramid transform in I7. By knowing the PSF, the image pyramid computation can be organized optimally to reduce processing time.

In one implementation, a lower lighting condition may be present. In this case, it may not be possible to obtain a short exposure image with sufficiently high edge content and sufficiently low pixel noise. In this case, three frames may be used, in accordance with the method shown in FIG. 12. The first two will both be short exposure frames. They will be aligned in L5 and averaged in L2 in order to produce a short exposure frame with lower noise. In these conditions, the gyroscope PSF is vital for lining up the frames, because the image processing methods for frame alignment will be extremely difficult to use in conditions where edges can be confused with pixel noise. After the two short exposure frames have been aligned and averaged, they will be combined using the blending techniques, as discussed above.

Various implementations for electronically stabilizing an image have been described. Nevertheless, one of ordinary skill in the art will readily recognize that there that various modifications may be made to the implementations, and those variations would be within the scope of the present invention. For example, in one implementation, it is desired to produce the image along with its thumbnail, for use in an image gallery. It may not be necessary to do any further processing in order to produce the thumbnail, as the image pyramid generates this automatically. The desired level of the pyramid for thumbnail creation should be stored as a separate data structure, and output along with the image. In one implementation, memory can be stored by using a compressed version of the wavelet transform. In one implementation, the algorithm can be run in JPEG2000 space, directly on the coefficients of the JPEG2000 images.

In one implementation, it may be desirable obtain a wide dynamic color range within the image. For example, in images in which some areas are poorly lit and other areas are brightly lit, a single exposure time cannot resolve all areas of the image. Either the image will have parts that are underexposed, or parts that are overexposed. As this system relies on combining short and long exposures, it is possible to achieve a wide dynamic range by simply over exposing the long image instead of using an appropriate exposure time. The blending weights must be adjusted accordingly. In another dynamic, it may be desirable to perform de-convolution on the long exposure using the gyroscope based PSF using conventional techniques. For systems involving a small amount of processing power, it may be required to perform the algorithm on small portions of the image at a time. For example, if the image is 3 MP, but the LCD on the handheld device has only QVGA resolution, the algorithm should be run on the image gradually, one QVGA portion at a time. In this manner, while it may take a long time to finish producing the final image, a user can select any QVGA portion desired and see the result of the algorithm at that portion without any substantial delay.

In one implementation, in which images are transferred from the handheld device to a PC or a remote server, it may be desirable to run the algorithm on the PC or server instead of on the handheld device. In this case, the gyroscope data can be included in a header in the image file, and may be post-processed at a later time.

Accordingly, many modifications may be made without departing from the scope of the present invention.

What is claimed is:

1. A method for electronically stabilizing an image captured by a device, the device including a motion detection unit, the method comprising:

capturing a first exposure of the image, the first exposure being a short exposure;

capturing a second exposure of the image including using the motion detection unit to ensure that the second exposure of the image has a pre-determined blur property, the pre-determined blur property based on the motion detection unit sensing movement of the device during the second exposure that substantially matches a pre-determined movement, the second exposure being longer than the first exposure wherein ensuring that the second exposure of the image has a pre-determined blur property includes discarding at least one previous captured second exposure of the image that does not have the pre-determined blur property; and combining the second exposure of the image having the pre-determined blur property and the first exposure of the image to electronically stabilize the image captured by the device.

2. The method of claim 1, wherein the motion detection unit comprises one or more of a gyroscope, an accelerometer, a magnetic field sensor, an ultrasonic transducer, or an image processor.

3. The method of claim 2, wherein the gyroscope comprises a microelectromechanical systems (MEMS) gyroscope, a piezo gyroscope, or a quartz gyroscope.

4. The method of claim 2, wherein the MEMS gyroscope comprises a dual-axis MEMS gyroscope.

5. The method of claim 1, wherein the motion detection unit is a gyroscope, and wherein using the gyroscope to ensure that the second exposure of the image has a pre-determined blur property includes ensuring that an output reading of the gyroscope indicates the pre-determined movement of the device during the second exposure.

6. The method of claim 5, wherein the pre-determined movement of the device during the second exposure corresponds to a substantially linear movement of the device.

7. The method of claim 6, wherein combining the second exposure of the image having the pre-determined blur property and the first exposure of the image to electronically stabilize the image captured by the device includes:

performing edge detection in the second exposure of the image to detect edges that are substantially parallel to the linear movement of the device to isolate usable edges from the second exposure of the image; and combining the useable edges from the second exposure of the image with edges in the first exposure of the image.

8. The method of claim 7, wherein performing edge detection in the second exposure of the image to detect edges that are substantially parallel to the linear movement of the device includes using an edge detection algorithm.

9. The method of claim 8, wherein the edge detection algorithm comprises wavelet edge detection and uses a point spread function (PSF).

10. The method of claim 7, wherein the first exposure is substantially in the range of 5 ms-50 ms and the second exposure is approximately 4-16 times longer than the first exposure.

11. The method of claim 1, wherein a duration of the short exposure and a duration of the long exposure are based upon a motion of the device and ambient lighting conditions.

12. The method of claim 1, wherein the device comprises one of a camera phone or a compact digital still camera.

13. The method of claim 1, further comprising:

capturing a third exposure of the image including using the motion detection unit to ensure that the third exposure of the image has the pre-determined blur property, the third exposure also being longer than the first exposure;

wherein combining the second exposure of the image having the pre-determined blur property and the first exposure of the image additionally includes combining the third exposure of the image having the pre-determined blur property to electronically stabilize the image captured by the device.

14. A device comprising:
a motion detection unit;
an image generator to capture a first exposure of an image, the first exposure being a short exposure;
the image generator to further capture a second exposure of the image including using the motion detection unit to ensure that the second exposure of the image has a pre-determined blur property, the pre-determined blur property based on the motion detection unit sensing movement of the device during the second exposure that substantially matches a pre-determined movement, the second exposure being longer than the first exposure wherein ensuring that the second exposure of the image has a pre-determined blur property includes discarding at least one previous captured second exposure of the image that does not have the pre-determined blur property; and
a processor to combine the second exposure of the image having the pre-determined blur property and the first exposure of the image to electronically stabilize the image.

15. The method of claim 1 wherein ensuring that the second exposure of the image has a pre-determined blur property includes using a point spread function (PSF) in conjunction with data from the motion detection unit to determine a type of blur in the second exposure of the image.

16. The method of claim 1 wherein the capturing the first exposure includes using a point spread function (PSF) to select an image having a least amount of blur among a plurality of captured first exposures of the image.

17. The method of claim 1 wherein the combining the first and second exposures includes using a point spread function (PSF) and data from the motion detection unit to determine an amount of shift between the first and second exposures.

18. The method of claim 1 wherein a point spread function (PSF) is used to determine whether to use only the second exposure as the image.

19. The device of claim 14 wherein the image generator ensuring that the second exposure of the image has a pre-determined blur property includes using a point spread function (PSF) in conjunction with data from the motion detection unit to determine a type of blur in the second exposure of the image.

20. A method for electronically stabilizing an image captured by a device, the device including a motion detection unit, the method comprising:
capturing a first exposure of the image, the first exposure being a short exposure;
capturing a second exposure of the image including using the motion detection unit to ensure that the second exposure of the image has a pre-determined blur property, the pre-determined blur property based on the motion detection unit sensing movement of the device during the second exposure that substantially matches a pre-determined movement, the second exposure being longer than the first exposure; and
combining the second exposure of the image having the pre-determined blur property and the first exposure of the image to electronically stabilize the image captured by the device;
wherein a point spread function (PSF) is used to determine whether to use only the second exposure as the image.

21. A method for electronically stabilizing an image captured by a device, the device including a motion detection unit, the method comprising:
capturing a first exposure of the image, the first exposure being a short exposure;
capturing a second exposure of the image including using the motion detection unit to ensure that the second exposure of the image has a pre-determined blur property, the pre-determined blur property based on the motion detection unit sensing movement of the device during the second exposure that substantially matches a pre-determined movement, the second exposure being longer than the first exposure; and
combining the second exposure of the image having the pre-determined blur property and the first exposure of the image to electronically stabilize the image captured by the device;
wherein the motion detection unit is a gyroscope, and wherein using the gyroscope to ensure that the second exposure of the image has a pre-determined blur property includes ensuring that an output reading of the gyroscope indicates the pre-determined movement of the device during the second exposure;
wherein the pre-determined movement of the device during the second exposure corresponds to a substantially linear movement of the device;
wherein combining the second exposure of the image having the pre-determined blur property and the first exposure of the image to electronically stabilize the image captured by the device includes: performing edge detection in the second exposure of the image to detect edges that are substantially parallel to the linear movement of the device to isolate usable edges from the second exposure of the image; and combining the useable edges from the second exposure of the image with edges in the first exposure of the image;
wherein performing edge detection in the second exposure of the image to detect edges that are substantially parallel to the linear movement of the device includes using an edge detection algorithm; and
wherein the edge detection algorithm comprises wavelet edge detection and uses a point spread function (PSF).

* * * * *